March 10, 1925.

C. BOUIN

CAMERA

Filed June 27, 1922

1,529,297

INVENTOR:
Charles Bouin

Patented Mar. 10, 1925.

1,529,297

UNITED STATES PATENT OFFICE.

CHARLES BOUIN, OF BOSTON, MASSACHUSETTS.

CAMERA.

Application filed June 27, 1922. Serial No. 571,291.

*To all whom it may concern:*

Be it known that I, CHARLES BOUIN, a citizen of the United States, residing at Boston, in the county of Suffolk and State of Massachusetts, have invented certain new and useful Improvements in Cameras, of which the following is a specification.

This invention relates to improvements in methods of and apparatus for the production of single angle images upon a standard size motion picture film.

The invention relates more particularly to a hand camera employing a standard size motion picture negative film.

Some of the objects of the camera to be described are as follows:—

To register upon the standard size negative motion picture film, images of scenes or objects which are one inch by 3/4 inch in size; images may be 1 inch in height by 3/4 inch in width or 3/4 inch in height by one inch in width according to position of camera when taking pictures.

From such negative images position enlargements may be made to whatever size desired.

The advantages of small size negative images are as follows: Economy in amount of film consumed. The greater number of exposures which may be made in a given amount of film. The greater depth of focus possessed of small lenses.

Another object of the style of camera to be described, is; to render said camera foolproof, whereby no two exposures can be made on the same area of film nor can any film area be advanced through film-gate apertures without an exposure being made thereon thereby correcting the mistake of making a double exposure on same area of film, or having some area of films unexposed, which is so common in the present day methods of manipulation of film cameras.

Further objects and advantages of the present invention will be pointed out in the hereinafter following description of one embodiment hereof, or will be obvious to those skilled in the mentioned arts.

Figure 1:
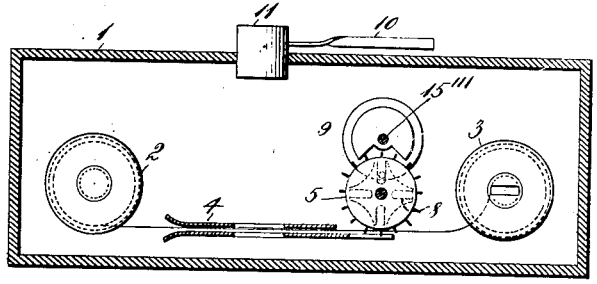
Figure 2:
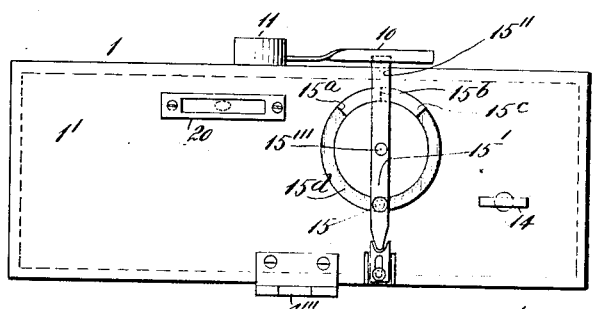
Figure 3:
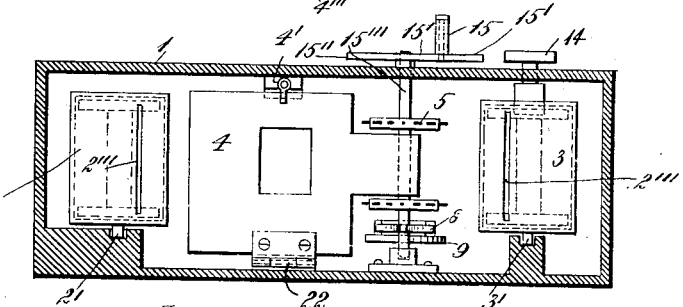
Figure 4:
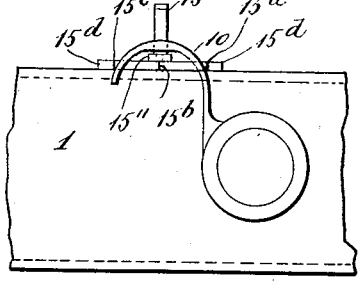
Figure 5:
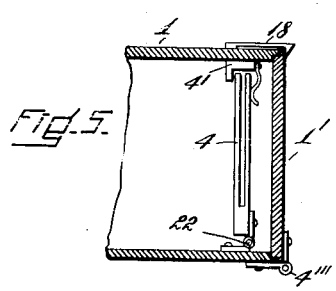
Figure 6:
Figure 7:
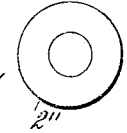
Figure 8:
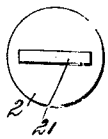
Figure 9:
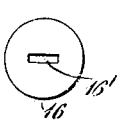
Figure 10:
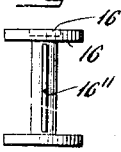

Referring to the accompanying drawings:
Fig. 1, is a cross-sectional plan view.
Fig. 2, is a plan view.
Fig. 3, is a rear elevation with rear of camera removed.
Fig. 4, is a broken front elevation of camera.
Fig. 5, is a left side elevation showing groove in film gate.
Fig. 6, is an elevation of magazine and magazine cover.
Fig. 7, represents top or cover of film magazine.
Fig. 8, represents bottom of film magazine.
Fig. 9, represents top section of film spool.
Fig. 10, represents general view of spool upon which film is wound.

In Fig. 1, which represents a cross-sectional plan view, 1, represents front wall of camera; 2, represents film magazine which contains unexposed film; 3, represents film magazine into which exposed film is wound; 4, represents film gate through which film is advanced; 8 and 9 representing the Maltese-cross intermittent motion, and sprocket wheel 5 is the means employed to advance film between exposures; one revolution of gear 9 will cause the Maltese-cross 8 to revolve 1/4 turn, sprocket wheel 5 being on the same shaft as Maltese-cross 8 will also revolve 1/4 turn; sprocket wheel 5 having 16 teeth of standard distance from each other will advance film four film perforations or 3/4 of an inch through film gate to each complete revolution of gear 9; 10, represents a lever which controls the lens shutters; 11, represents the lens.

In Fig. 2, which is a plan view, 15 is a handle which in making one complete revolution will cause film to rest and advance intermittently; when period of rest of film is reached, the arm 15′ pressing upon lever 10 will cause lens shutter to operate and exposure made; in the position as shown in Fig. 2, arm 15′ is in a locked position, the rear end of arm 15′ being engaged in a slidable grooved wedge, running in guides which are attached to frame of camera; the forward end of arm 15′ as indicated by 15″ is shown extending under lever 10 and in such a position prevents lever 10 from being pressed down; beneath said handle and arm and on top cover of camera is a circle and of such a circle 15ᵈ is a dark section and from 15ª to 15ᶜ is a light section, 15ᵇ being the centre of the light section.

Disengaging grooved wedge from arm 15', when handle 15 revolves the arm 15' over the shaded section 15ᵈ from 15ᶜ to 15ª in the shaded section of circle it indicates the period of advancement of film and also the period of closure of lens shutter; when handle 15 revolves the arm 15' over the light section from 15ª to 15ᶜ of circle it indicates the period of rest of film, opening of lens shutter and exposure, the end of arm 15' coming in contact with lever 10 and pressing said lever down opens lens shutter, from point 15ᵇ to 15ᶜ the pressure upon lever 10 becomes released thereby allowing lens shutter to close. For time exposures, arm 15' is allowed to rest at point 15ᵇ the desired length of time; to each revolution of handle 15 section 15" or arm 15' will pass beneath lever 10 during a period of advancement of film and prevent lever 10 from being accidently operated. When camera is not in use and the arm 15' is in position as in Fig. 2, no accidental exposure can be made. 4''' is a spring catch for keeping rear door of camera closed; 14 is a small projection, the lower end of which being in contact with film spool for the purpose of winding loose film upon spool.

In Fig. 3, which is a rear elevation with rear camera door removed, 2 is a film magazine in which is placed unexposed films; 2' is a film magazine extension which fits in a groove in body of camera, the purpose of which being to hold film magazine in position and to prevent turning of same; 3 is the film magazine which receives the exposed film; 3' being for the same purpose as 2'; 4' is a catch for keeping film gate in position; 4 is the film gate with aperture; 22 is a hinge allowing film gate to be tilted backward for the purpose of inserting film; 2''' are openings in film magazines for passage of film; 15 is the handle by means of which arm 15' is revolved, at the right 15' is the part of arm which engages and presses lever 10 and 15" is the part of arm which is under lever and prevents operation of lever 10 respectively when such parts of arm are in an operative position in association with lever 10. In Fig. 3, both ends of arm are in a disengaged position; 14 is the projection, one end of which is outside of camera and the other end engages film spool in film magazine 3; 5 is a sprocket wheel with sixteen teeth of standard size and distance from each other at each end of said sprocket wheel; 8 and 9 are the Maltese-cross intermittent motion gears. Arm 15' and gear 9 being on the same shaft 15''', the Maltese-cross and sprocket wheel being on another shaft; one revolution of handle 15 also causes arm 15' and gear 9 to revolve once and during such a revolution one end of arm 15' has pressed lever 10 thereby opening lens shutter and exposure made during period of rest of film and the other end of arm 15' has been brought under lever 10 thereby presenting said lever to be operative during a period of advancement of film so that no two exposures can be made on same area of film nor can any area of film be accidently unexposed.

Fig. 4, is a front elevation, showing lever 10 which extends above top cover of camera, said lever being semi-circular in shape; this lever controls the shutter working mechanism of lens; the arm end 15" is shown in position under lever 10 and in such a position prevents lever 10 from being accidently pressed downward; 15 is the arm handle and 15ᵇ, 15ᶜ, 15ª, 15ᵈ are different parts of circle corresponding to and explained in Fig. 2.

In Fig. 5, is a sectional side elevation, 1' is the rear door or opening of camera, 4''' is a hinge allowing opening of rear door of camera and 18 is a spring catch for said rear door; 4 is a film gate and aperture plate combined, 4' is a combination to hold film gate in proper erect position and 22 is a hinge allowing film gate to be moved in a backward direction for the purpose of inserting film in film gate.

Fig. 6, is an elevation, showing a film magazine 2, magazine cover 2" fitting light tight, 2''' is opening in magazine for film passage and 2' is projection at bottom and across diameter of magazine.

Fig. 7, is a plan view of magazine cover of magazine which receives the exposed film and in such a cover a circular opening is made as indicated by the inner circle of 2".

In Fig. 8, is shown the bottom of film magazines having a narrow projection across diameter of said bottom.

In Fig. 9, is shown a top plan view of film spool 16, and 16' is a slot to receive the lower end of projection 14 as in Fig. 3.

In Fig. 10, which is an elevation of film spool, 16' is the slot at top of film spool and 16" is a groove into which film is inserted.

I do not confine myself to the particular style of camera here shown, but various other changes and modifications, within the skill of those versed in the mentioned arts may be made in such a camera without departing from the spirit of my invention, provided the principle set forth in the following claims be employed.

Having thus described my invention, I claim:

In a hand operated camera, a casing, a single aperture film gate mounted in the casing, a lens shutter on the casing in line with said aperture, a controlling lever for the shutter extending above the top of the casing, means for advancing a film through the film gate and including a handle arranged exteriorly of the casing for intermittently advancing the film a step upon each complete revolution of the handle, said handle extending in the path of said controlling lever for contact therewith to actuate the lever and open the shutter, said handle being arranged upon said film advancing means to arrest the movement of the film during the time period of operation of the lens shutter, and means carried by the casing cooperative with said handle for indicating the relative positions of the handle in advancing and holding stationary the film in the shutter.

This specification signed and witnessed this 24th day of June, 1922.

CHARLES BOUIN.

Witnesses:
MAY R. McEVOY,
MARGARET PEABODY.